US012784470B2

(12) United States Patent
Kataoka

(10) Patent No.: US 12,784,470 B2
(45) Date of Patent: Nov. 3, 2026

(54) CENTER DEVICE, ON-VEHICLE DEVICE, AND SAFETY CONFIRMATION SYSTEM

(71) Applicant: DENSO TEN Limited, Kobe (JP)

(72) Inventor: Chiharu Kataoka, Kobe (JP)

(73) Assignee: DENSO TEN Limited, Kobe (JP)

( * ) Notice: Subject to any disclaimer, the term of this patent is extended or adjusted under 35 U.S.C. 154(b) by 118 days.

(21) Appl. No.: 18/606,449

(22) Filed: Mar. 15, 2024

(65) Prior Publication Data

US 2025/0148807 A1 May 8, 2025

(30) Foreign Application Priority Data

Nov. 8, 2023 (JP) ................................ 2023-190562

(51) Int. Cl.
*G06V 20/59* (2022.01)

(52) U.S. Cl.
CPC .................................. *G06V 20/59* (2022.01)

(58) Field of Classification Search
CPC .... G06V 20/59; G06V 20/597; G06V 20/593; G06V 20/44; G06V 20/52; G06V 20/53; G06V 20/54; G06V 20/58; H04N 7/183
USPC .......................................................... 348/148
See application file for complete search history.

(56) References Cited

U.S. PATENT DOCUMENTS

2010/0085171 A1* 4/2010 Do ........................ G08B 25/10
348/148
2010/0141762 A1* 6/2010 Siann .................. H04N 23/661
348/372

FOREIGN PATENT DOCUMENTS

JP 2015-176566 A 10/2015
JP 2023-007135 A 1/2023

* cited by examiner

*Primary Examiner* — Nathnael Aynalem
(74) *Attorney, Agent, or Firm* — Oliff PLC

(57) ABSTRACT

A center device includes a controller configured to: receive vehicle information related to a behavior of a vehicle from an on-vehicle device; in a case where detecting an occurrence of an abnormality from the vehicle information, request a camera image inside the vehicle from the on-vehicle device; in a case where there presents no response to the request from the on-vehicle device, transmit a control signal for forcibly transmitting the camera image inside the vehicle; and acquire the camera image inside the vehicle from the on-vehicle device.

8 Claims, 10 Drawing Sheets

CENTER DEVICE, ON-VEHICLE DEVICE, AND SAFETY CONFIRMATION SYSTEM

CROSS-REFERENCE TO RELATED APPLICATION

This application is based upon and claims the benefit of priority of the prior Japanese Patent Application No. 2023-190562, filed on Nov. 8, 2023, the entire contents of which are incorporated herein by reference.

FIELD

The embodiment discussed herein is (are) directed to a center device, an on-vehicle device, and a safety confirmation system.

BACKGROUND

Conventionally, there has been proposed a technology that executes, in a case where a vehicle falls into an emergency state due to an accident or the like, reporting from an on-vehicle device mounted on the vehicle to a report center, for example (see Japanese Laid-open Patent Publication No. 2015-176566, for example). In the above-mentioned technology, in a case where the acceleration of the vehicle exceeds a predetermined threshold, the reporting is executed to the report center while estimating that an accident whose impact is large such as a collision accident has occurred.

In such a case, for example, it is preferable that safety confirmation of an occupant in a vehicle is executed based on a camera image. In this point, there has been proposed a technology in which a third person executes remote monitoring on camera images (hereinafter, may be appropriately referred to as "vehicle-inside image") inside a vehicle (see Japanese Laid-open Patent Publication No. 2023-007135, for example). By employing such a technology, safety confirmation of an occupant with the use of a vehicle-inside image is considered to be possible.

However, in the above-mentioned conventional technology, there is a room for improvement in enabling realization of safety confirmation of an occupant with the use of a vehicle-inside image even in a case where a vehicle-inside image is set to an OFF state.

For example, an occupant of a vehicle sets a vehicle-inside camera, which captures a vehicle-inside image, to an OFF state while giving priority to privacy protection in some cases. In this case, it is impossible to transmit a vehicle-inside image to a report center, so that it is difficult for an operator of a report center to execute safety confirmation of an occupant with the use of a vehicle-inside image even in a case where an accident or the like occurs.

SUMMARY

A center device according to one aspect of an embodiment includes a controller configured to: receive vehicle information related to a behavior of a vehicle from an on-vehicle device; in a case where detecting an occurrence of an abnormality from the vehicle information, request a camera image inside the vehicle from the on-vehicle device; in a case where there presents no response to the request from the on-vehicle device, transmit a control signal for forcibly transmitting the camera image inside the vehicle; and acquire the camera image inside the vehicle from the on-vehicle device.

BRIEF DESCRIPTION OF DRAWING(S)

DESCRIPTION OF EMBODIMENTS

Hereinafter, embodiments of a center device, an on-vehicle device, and a safety confirmation system will be described in detail with reference to the accompanying drawings. Moreover, the disclosed technology is not limited to the embodiments described below.

Hereinafter, a center device according to an embodiment is assumed to be a server device 100 that is included in a safety confirmation system 1 (see FIG. 2 and the following). Hereinafter, an on-vehicle device according to the embodiment is assumed to be a communication-type dashboard camera 10 (see FIG. 2 and the following) that is configured to communicate with the server device 100. Hereinafter, a safety confirmation method according to the embodiment is assumed to be a safety confirmation method to be executed by a controller 103 (see FIG. 4 and the following) of the server device 100.

Moreover, expression of "specific", "preset", and "constant" in the following description may be replaced with "predetermined".

Figure 1:
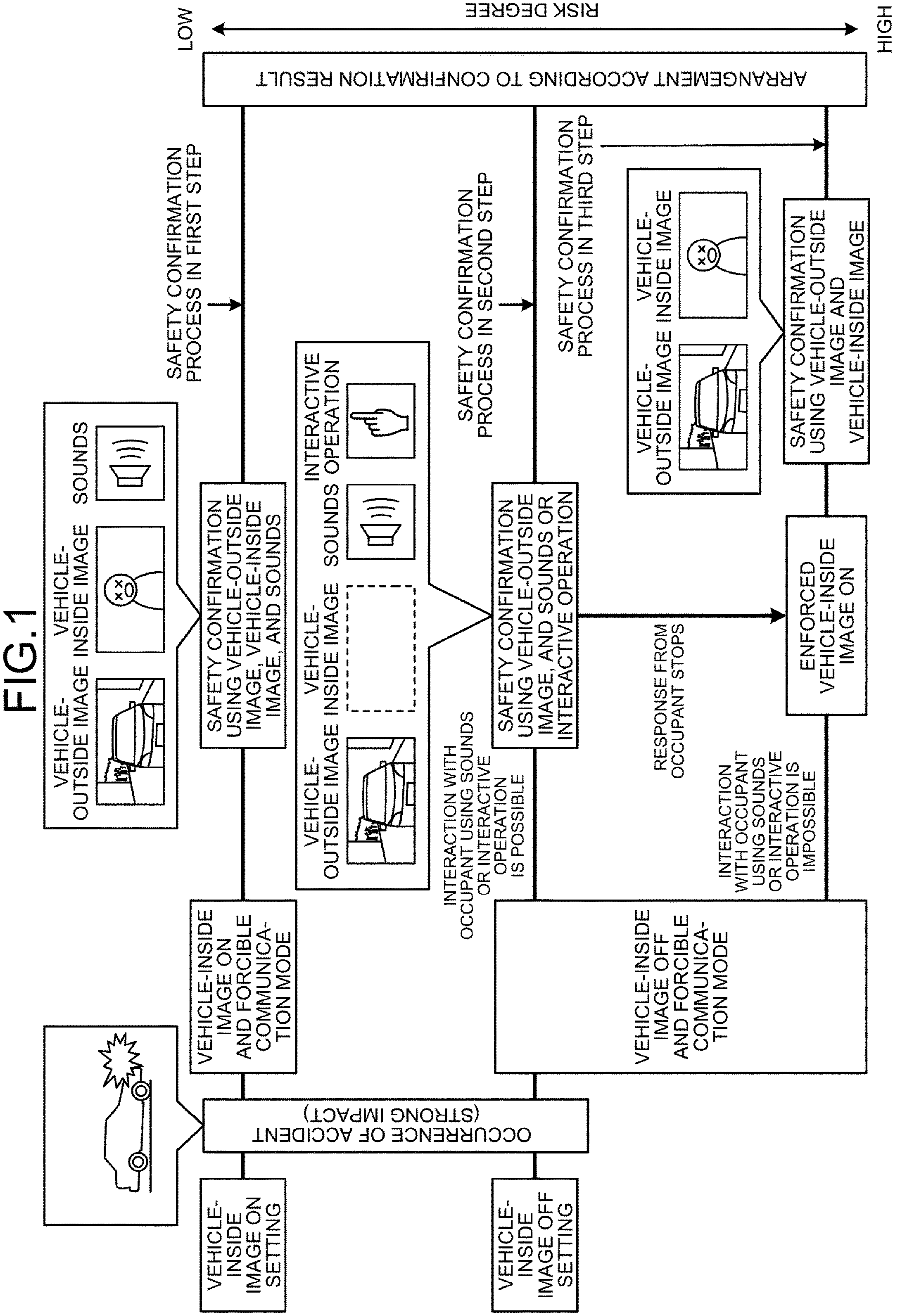
FIG. 1 is a diagram illustrating the outline of a safety confirmation method according to an embodiment.

The outline of a safety confirmation method according to the embodiment will be explained with reference to FIG. 1. FIG. 1 is a diagram illustrating the outline of a safety confirmation method according to the embodiment.

In the safety confirmation method according to the embodiment, the controller 103 of the server device 100 receives vehicle information related to a behavior of a vehicle from the dashboard camera 10. In a case where detecting an occurrence of an abnormality from the above-mentioned vehicle information, the controller 103 requests a vehicle-inside image from the dashboard camera 10. In a case where there presents no response to the above-mentioned request from the dashboard camera 10, the controller 103 transmits a control signal for forcibly causing to transmit a vehicle-inside image so as to acquire a vehicle-inside image from the dashboard camera 10.

Specifically, caused by a trigger using a fact that the dashboard camera 10 detects, as a strong impact, an acceleration (corresponding to one example "strong acceleration") that is equal to or more than a predetermined threshold, the controller 103 executes a gradual safety confirmation process on an occupant of a vehicle. In this case, the controller 103 executes a gradual safety confirmation process in accordance with an ON state or an OFF state of a vehicle-inside camera 13*b* (see FIG. 3) included in the dashboard camera 10. Steps of the above-mentioned safety confirmation process are preliminarily associated with a risk degree of an occupant, only in a case where a step in the safety confirmation process indicates a risk degree that is higher than a threshold, if the vehicle-inside camera 13*b* is in an OFF state, the controller 103 forcibly changes the OFF state into an ON state.

More specifically, as illustrated in FIG. 1, the dashboard camera 10 includes two setting states of a "vehicle-inside image ON setting" in which the vehicle-inside camera 13*b* is in an ON state, and a "vehicle-inside image OFF setting" in which the vehicle-inside camera 13*b* is in an OFF state. In a case of the "vehicle-inside image OFF setting", the dashboard camera 10 does not transmit a vehicle-inside image to the server device 100 even in a case where receiving a request for a vehicle-inside image from the server device 100. In many cases, an occupant of a vehicle gives priority to privacy protection so as to select the "vehicle-inside image OFF setting".

However, in a case where a strong impact occurs due to an accident or the like, it is necessary to execute safety confirmation on an occupant, so that it is preferable to utilize a vehicle-inside image in order to appropriately perform safety confirmation. Note that in a case where an occupant has set the vehicle-inside camera 13*b* to an OFF state, it is preferable to perform safety confirmation while avoiding use of a vehicle-inside image as much as possible from a viewpoint of privacy protection.

Thus, in a safety confirmation method according to the embodiment, the controller 103 executes step-by-step a safety confirmation process in the first step, a safety confirmation process in the second step, and a safety confirmation process in the third step in accordance with an ON state or an OFF state of the vehicle-inside camera 13*b*. Therefore, it is possible to perform, in accordance with an ON state or an OFF state of the vehicle-inside camera 13*b*, bare minimum safety confirmation while comparing a priority of privacy protection of an occupant with a risk degree of the occupant.

Note that steps of the safety confirmation process are associated with a risk degree of an occupant, and as illustrated in FIG. 1, a risk degree increases in the order of the first step, the second step, and the third step.

In a case where an accident occurs, the dashboard camera 10 turns into a "forcible communication mode" regardless of a step of the safety confirmation process. In the above-mentioned mode, communication connection is unconditionally enabled between the dashboard camera 10 and a call center by the server device 100. Thus, in a case where an accident has occurred, it is possible to attempt safety confirmation using sounds from at least call center.

As illustrated in FIG. 1, in a case of a "vehicle-inside image ON setting" in which the vehicle-inside camera 13*b* is in an ON state, the controller 103 executes a first-step safety confirmation process in which safety confirmation using a vehicle-outside image, a vehicle-inside image, and a sound is executed. In a case of a "vehicle-inside image ON setting", in a case where receiving a request for a vehicle-inside image from the server device 100, the dashboard camera 10 transmits a vehicle-inside image to the server device 100.

In a case of a "vehicle-inside image OFF setting" in which the vehicle-inside camera 13*b* is in an OFF state, if interaction with an occupant using a sound or an interactive operation is possible, the controller 103 executes a second-step safety confirmation process for performing safety confirmation with the use of a vehicle-outside image, and a sound or an interactive operation. In the second-step safety confirmation process, a priority of privacy protection of an occupant is higher than that of the first-step safety confirmation process. Thus, in a case where the vehicle-inside camera 13*b* is in an OFF state, it is possible to perform safety confirmation whose priority of privacy protection is higher than that in a case where the vehicle-inside camera 13*b* is in an ON state.

The interactive operation indicates an operation via an interactive screen which the controller 103 causes the dashboard camera 10 to display. Specific examples of the interactive screen will be mentioned later with reference to FIG. 8 to FIG. 10.

In a case of a "vehicle-inside image OFF setting", if interaction with an occupant with the use of a sound or an interactive operation is not possible, the controller 103 determines that a risk degree of an occupant is high, and further forcibly turns the vehicle-inside camera 13*b* into an ON state ("enforced vehicle-inside image ON") In a case of the "enforced vehicle-inside image ON", in a case where receiving a request for a vehicle-inside image from the server device 100, the dashboard camera 10 forcibly transmits a vehicle-inside image to the server device 100. Furthermore, the controller 103 executes a third-step safety confirmation process for performing safety confirmation with the use of a vehicle-outside image and a vehicle-inside image. In the third-step safety confirmation process, a priority of privacy protection of an occupant is lower than that in the second-step safety confirmation process. Thus, in a case where the vehicle-inside camera 13*b* is in an OFF state and further interaction is impossible, it is possible to perform safety confirmation whose priority of privacy protection is lower than that in a case where the vehicle-inside camera 13*b* is in an OFF state and further interaction is possible.

Note that the controller 103 also executes the third-step safety confirmation process in a case where a response from an occupant stops during a second-step safety confirmation process. In other words, in a situation where an occupant is estimated to be in a serious state, the controller 103 executes a third-step safety confirmation process in which the vehicle-inside camera 13*b* is turned into an ON state in priority to privacy protection.

The controller 103 executes arrangement according to confirmation result in each safety confirmation process. Herein, in accordance with confirmation result, the controller 103 executes an arrangement process for arranging a necessary vehicle, such as an ambulance, a patrol car, a wrecker truck, and a fire engine, personnel, and the like for a corresponding request destination (for example, medical institution, police station, fire station, or the like).

As described above, in the safety confirmation method according to the embodiment, the controller 103 receives vehicle information related to a behavior of a vehicle from the dashboard camera 10. In a case where detecting an occurrence of an abnormality from the vehicle information, the controller 103 requests a vehicle-inside image from the dashboard camera 10. In a case where there presents no response to the request from the dashboard camera 10, the controller 103 transmits a control signal for forcibly transmitting a vehicle-inside image, and further acquires the vehicle-inside image from the dashboard camera 10. Specifically, in a case where receiving a notification (corresponding to one example of "vehicle information") indicating that a strong acceleration is detected from the dashboard camera 10, the controller 103 detects an occurrence of an abnormality from the notification, and further executes a gradual safety confirmation process for safety confirmation with respect to an occupant of the vehicle. In a case where a step of the safety confirmation process preliminarily associated with a risk degree of an occupant exceeds a threshold, and further the vehicle-inside camera 13*b* is in an OFF state, the controller 103 forcibly turns the vehicle-inside camera 13*b* into an ON state. The controller 103 acquires a vehicle-inside image from the dashboard camera 10.

Thus, in accordance with the safety confirmation method according to the embodiment, it is possible to realize safety confirmation of an occupant with the use of a vehicle-inside image even in a case where a vehicle-inside image is set to an OFF state.

Hereinafter, a configuration example of the safety confirmation system 1 including the server device 100 to which the above-mentioned safety confirmation method according to the embodiment is applied will be more specifically explained.

Figure 2:
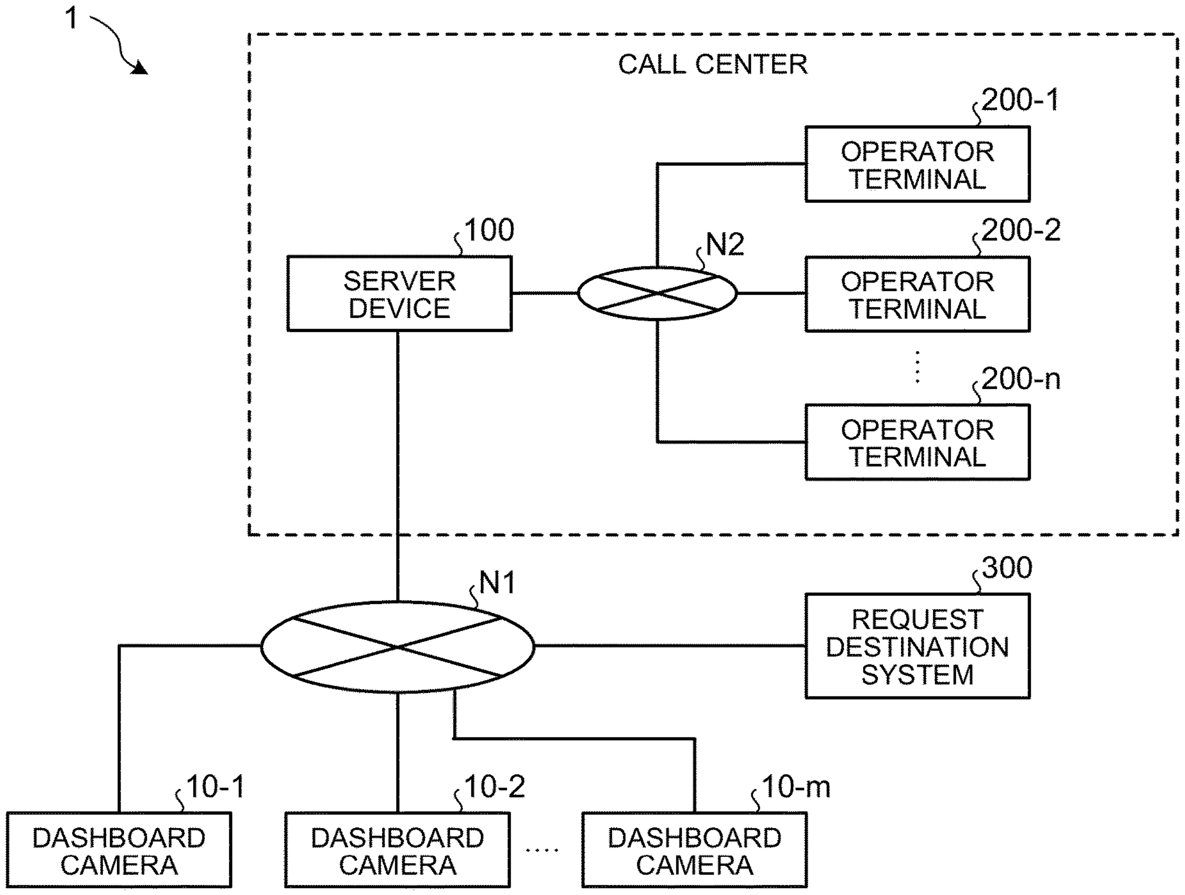
FIG. 2 is a diagram illustrating a configuration example of a safety confirmation system according to the embodiment.

FIG. 2 is a diagram illustrating a configuration example of the safety confirmation system 1 according to the embodiment. As illustrated in FIG. 2, the safety confirmation system 1 includes dashboard cameras 10-1, 10-2, . . . , 10-*m* (m is natural number that is equal to or more than one), the server device 100, operator terminals 200-1, 200-2, . . . , 200-*n* (n is natural number that is equal to or more than one), and a request destination system 300. The server device 100 and the operator terminals 200 constitute a call center.

The dashboard cameras 10, the server device 100, and the request destination system 300 are connected to be able to communicate with each other via a network N1 such as the Internet, a mobile telephone line network, and a Cellular Vehicle to Everything communication network (namely, C-V2X network).

The server device 100 and the operator terminals 200 are connected to be able to communicate with each other via a network N2 that is a private network managed by a provider running a call center, for example. Each of the operator terminals 200 is able to communicate with the dashboard camera 10 connected to the network N1 and the request destination system 300 via the server device 100.

The dashboard camera 10 records, in a ring buffer memory to be able to overwrite by a data amount corresponding to a predetermined time interval, vehicle data including a vehicle-outside image and a vehicle-inside image captured by a vehicle-outside camera 13*a* and the vehicle-inside camera 13*b* that are provided in an own device, and various data indicating situations of a vehicle.

In a case of a vehicle-inside image OFF setting (in other words, in a case where vehicle-inside camera 13*b* is in OFF state), the dashboard camera 10 does not capture or record a vehicle-inside image.

In a case where detecting, during a period during which a vehicle is start-up, a specific event such as occurrence of an accident and near miss, the dashboard camera 10 transmits a notification indicating that the above-mentioned event is detected to the server device 100. In the present embodiment, in a case where detecting a strong acceleration corresponding to a strong impact, the dashboard camera 10 transmits, to the server device 100, a notification indicating the detection.

In a case where detecting the above-mentioned specific event, the dashboard camera 10 sets vehicle data for a predetermined time interval before and after a detection time point such that overwriting thereon is forbidden. Or the dashboard camera 10 records vehicle data for a predetermined time interval before and after the detection time point in another recording medium.

In a case where detecting the above-mentioned specific event, the dashboard camera 10 transmits, to the server device 100, vehicle data for setting such that overwrite thereof is forbidden. In this case, the dashboard camera 10 may inform the server device 100 of detection of the specific event so as to transmit, to the server device 100, vehicle data in response to a request transmitted from the server device 100 that has received the abovementioned notification.

The server device 100 is realized as a private cloud server, for example. The server device 100 is managed by a provider that runs a call center, for example. The server device 100 collects vehicle data transmitted from the dashboard cameras 10.

The server device 100 executes a gradual safety confirmation process caused by a trigger using a fact that the dashboard camera 10 detects a strong acceleration. In this case, the server device 100 executes a gradual safety confirmation process according to an ON state or an OFF state of the vehicle-inside camera 13*b*, which is explained with reference to FIG. 1.

The operator terminal 200 is a terminal device that is used by an operator of a call center, and is realized by a Personal Computer (PC), a smartphone, or the like. Other than the above-mentioned, the operator terminal 200 may be realized by, for example, a tablet terminal, a wearable device, or the like.

On the basis of a vehicle-outside image and a vehicle-inside image on a monitor screen that are displayed on the operator terminal 200, communication with an occupant or interaction performed via an interactive operation, or the like; an operator performed safety confirmation on an occupant. On the basis of recognized confirmation result, the operator arranges a necessary vehicle such as an ambulance, a patrol car, a wrecker truck, and a fire engine, personnel, and the like for a corresponding request destination. Specifically, the operator accesses the request destination system 300 via the operator terminal 200 so as to transmit, to the request destination system 300, a request for a service of a necessary vehicle and/or personnel, for example.

In a case where receiving a request for the necessary means from the above-mentioned call center, the request destination system 300 executes a procedure for responding to the request.

Figure 3:
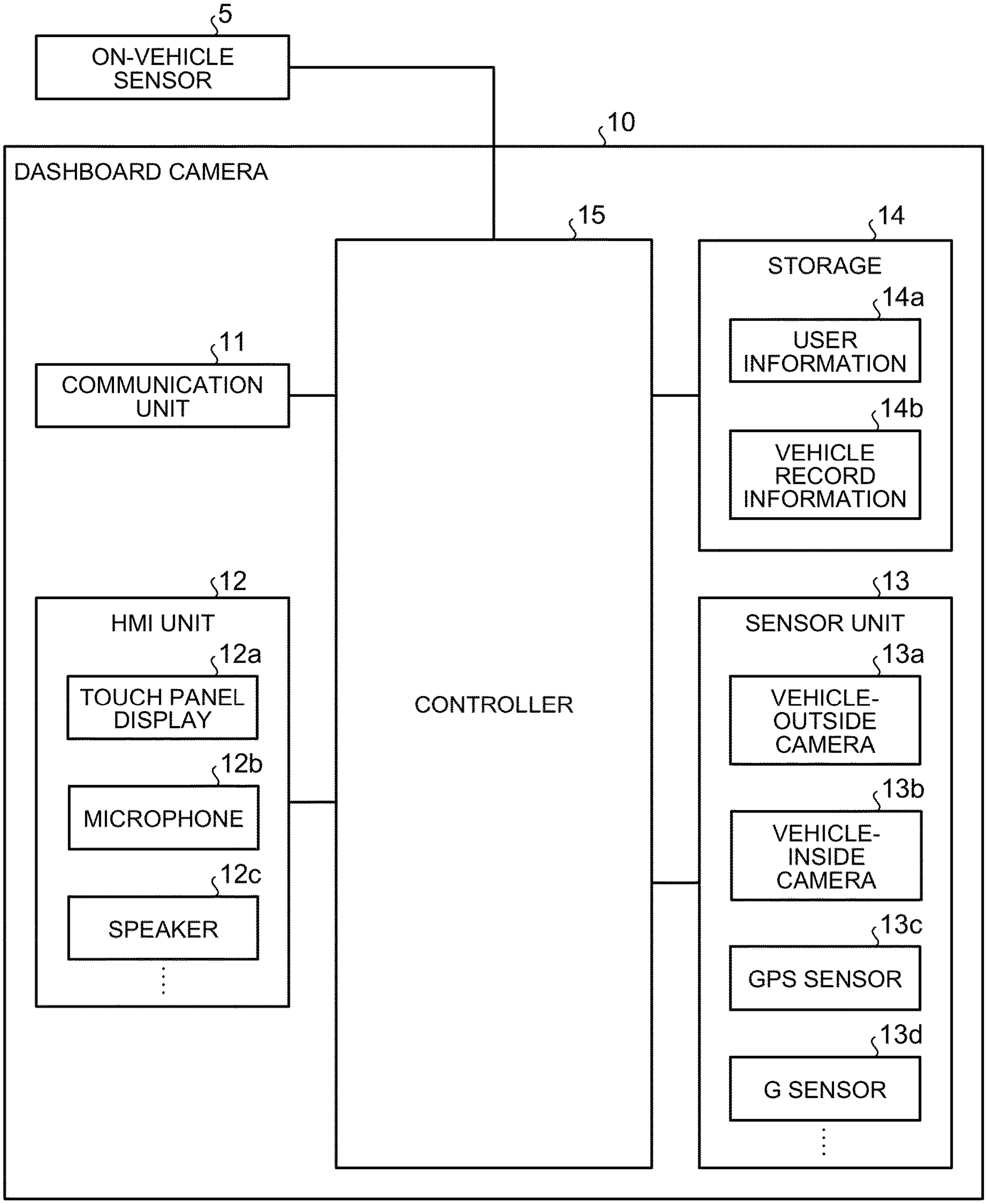
FIG. 3 is a diagram illustrating a configuration example of a dashboard camera according to the embodiment.

Next, a configuration example of the dashboard camera 10 will be explained. FIG. 3 is a diagram illustrating a configuration example of the dashboard camera 10 according to the embodiment. As illustrated in FIG. 3, the dashboard camera 10 includes a communication unit 11, a Human Machine Interface unit (HMI unit) 12, a sensor unit 13, a storage 14, and a controller 15.

The communication unit 11 is realized by a network adapter or the like. The communication unit 11 is connected to the network N1 in a wireless manner so as to transmit and receive information to and from the server device 100 via the network N1.

The HMI unit 12 is a configuration element configured to provide an interface component related to input and output to and from an occupant or the like that uses the dashboard camera 10. The HMI unit 12 includes an input interface that is configured to receive an input operation performed by an occupant or the like. The HMI unit 12 includes an output interface that is configured to present visual information and/or sound information for a driver or the like.

As illustrated in FIG. 3, the HMI unit 12 includes a touch panel display 12*a*, a microphone 12*b*, and a speaker 12*c*, for example. The touch panel display 12*a* corresponds to the above-mentioned input interface and output interface.

The touch panel display 12*a* displays an operation component with which an occupant performs ON setting or OFF setting of a vehicle-inside image, for example. The touch panel display 12*a* displays an interactive screen with which an occupant performs an interactive operation, and an operation component thereof, for example. Note that the operation components may be provided in the HMI unit 12 as hardware components without being displayed on the touch panel display 12*a* as software components.

The microphone 12*b* corresponds to an input interface of communication with the use of sounds between an operator of a call center and an occupant. The speaker 12*c* similarly corresponds to an output interface in communication.

The sensor unit 13 includes a various-sensor group provided in the dashboard camera 10. The sensor unit 13 includes the vehicle-outside camera 13*a*, the vehicle-inside camera 13*b*, a Global Positioning System sensor (GPS sensor) 13*c*, and a G sensor 13*d*, for example.

The vehicle-outside camera 13*a* is configured to be capable of capturing a vehicle-outside image of a vehicle. The vehicle-outside camera 13*a* is arranged near a windscreen, a dashboard, or the like so as to capture an image in front of the vehicle. The vehicle-outside camera 13*a* may be arranged near a back window or the like so as to be capable of capturing an image behind the vehicle.

The vehicle-inside camera 13*b* is configured to be capable of capturing a vehicle-inside image of the vehicle. The vehicle-inside camera 13*b* is arranged near a windscreen, a dashboard, or the like such that a capturing range thereof includes at least all occupants.

The GPS sensor 13*c* measures a GPS position of the vehicle. The G sensor 13*d* measures the acceleration applied to the dashboard camera 10.

In addition to the sensor unit 13, an on-vehicle sensor 5, which is a various-sensor group mounted on the vehicle, is connected to the dashboard camera 10. The on-vehicle sensor 5 includes, for example, a vehicle-speed sensor, an accelerator sensor, a brake sensor, and the like. The on-vehicle sensor 5 is connected to the dashboard camera 10 via an on-vehicle network such as a Controller Area Network (CAN).

The storage 14 is realized by a storage device such as a Read Only Memory (ROM), a Random Access Memory (RAM), and a flash memory. In the example illustrated in FIG. 3, the storage 14 stores therein user information 14*a* and vehicle record information 14*b*.

The user information 14*a* is information in which information related to a user using the dashboard camera 10 is associated with identification information of the dashboard camera 10. The information related to the user includes identification information of the user, identification information (for example, registered number of automobile) of a vehicle in which the dashboard camera 10 is provided, and the like.

The vehicle record information 14*b* is a database of vehicle data recorded by the dashboard camera 10.

The controller 15 corresponds to a so-called processor. The controller 15 is realized by a Central Processing Unit (CPU), a Graphical Processing Unit (GPU), or the like. The controller 15 executes a not-illustrated program according to the embodiment stored in the storage 14 while using a RAM as a work region. The controller 15 can be realized by an integrated circuit such as an Application Specific Integrated Circuit (ASIC) and a Field Programmable Gate Array (FPGA).

Figure 6:
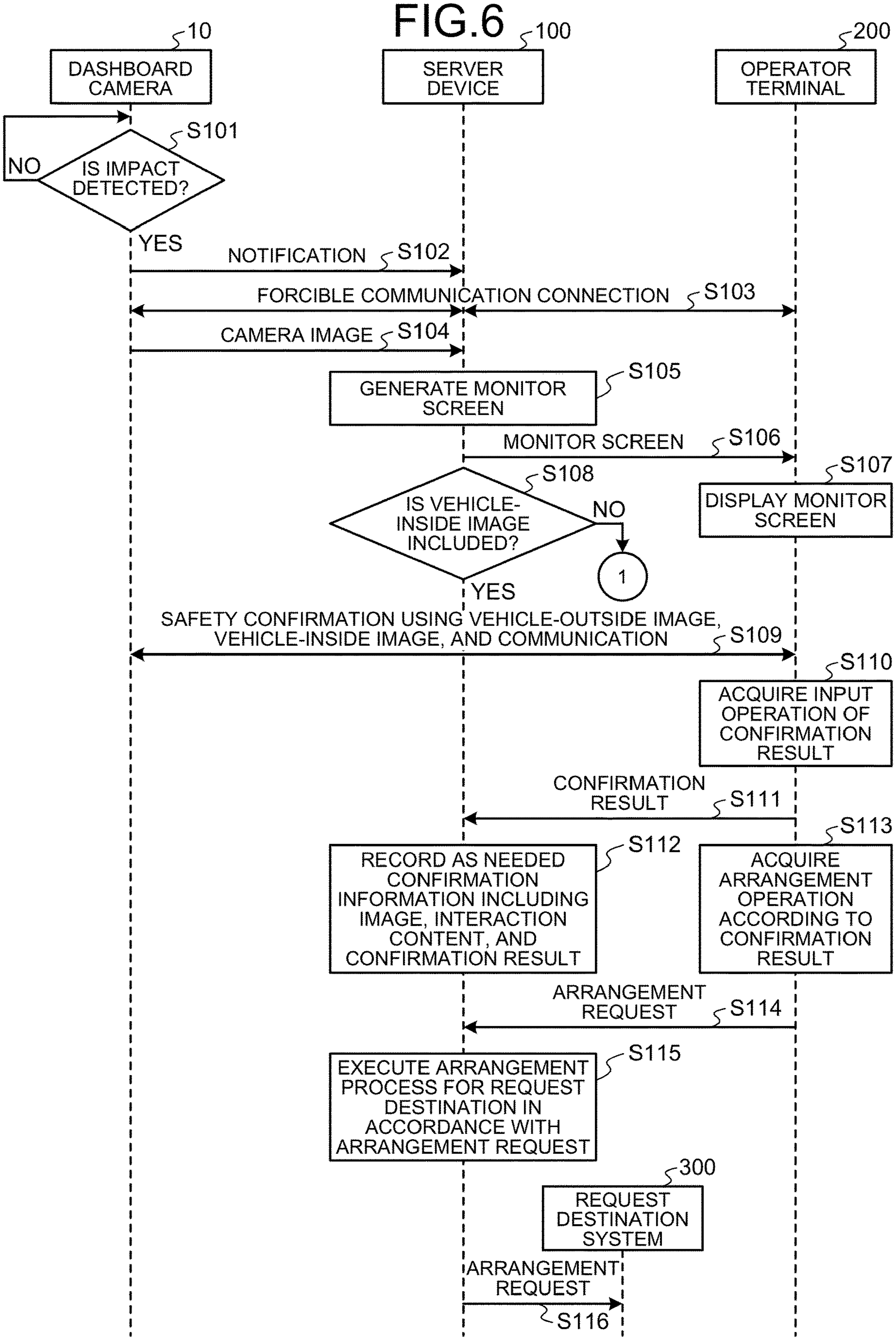
FIG. 6 is a diagram illustrating a processing sequence to be executed by the safety confirmation system according to the embodiment.
Figure 7:
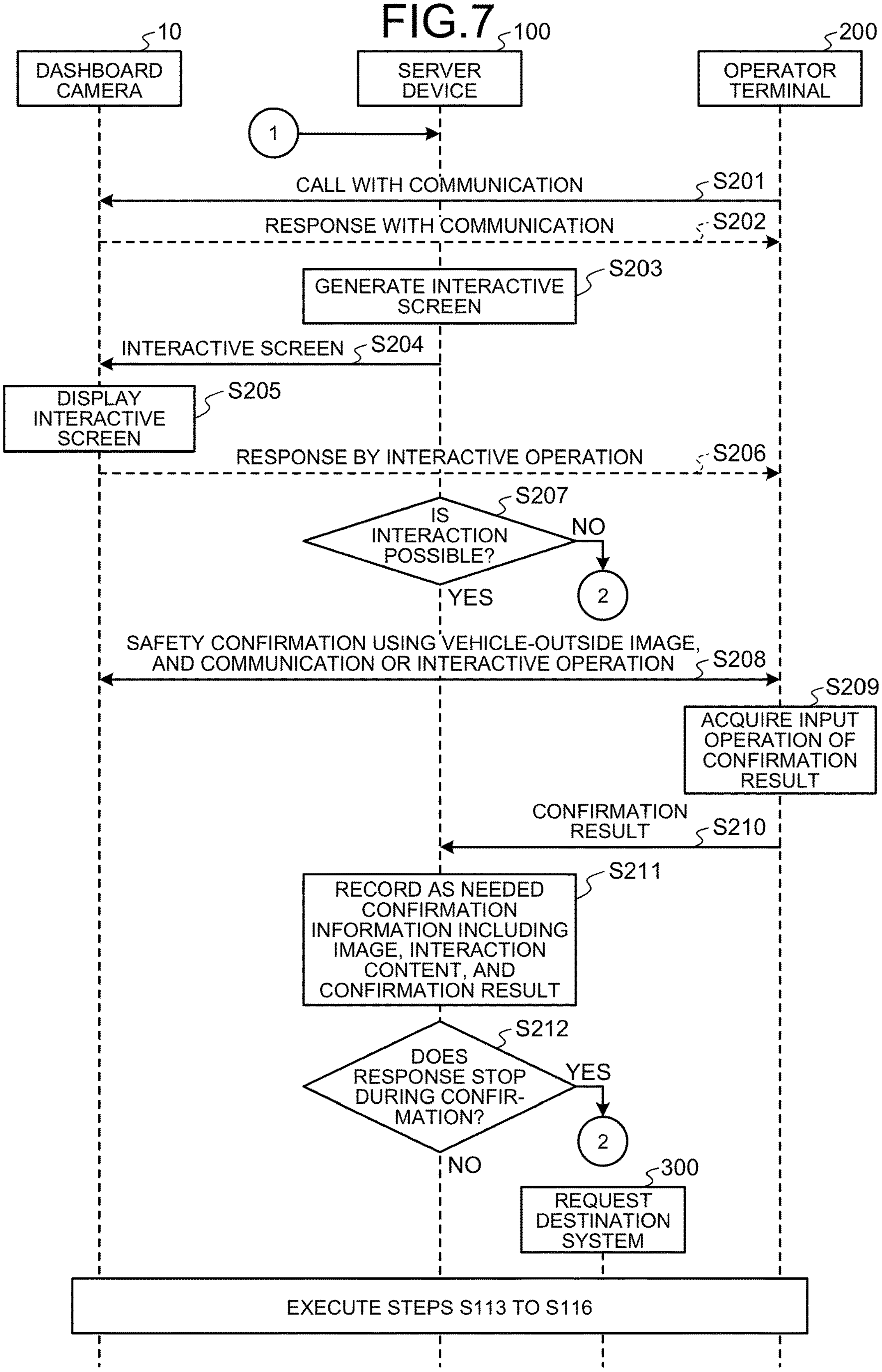
FIG. 7 is a diagram illustrating a processing sequence to be executed by the safety confirmation system according to the embodiment.
Figure 11:
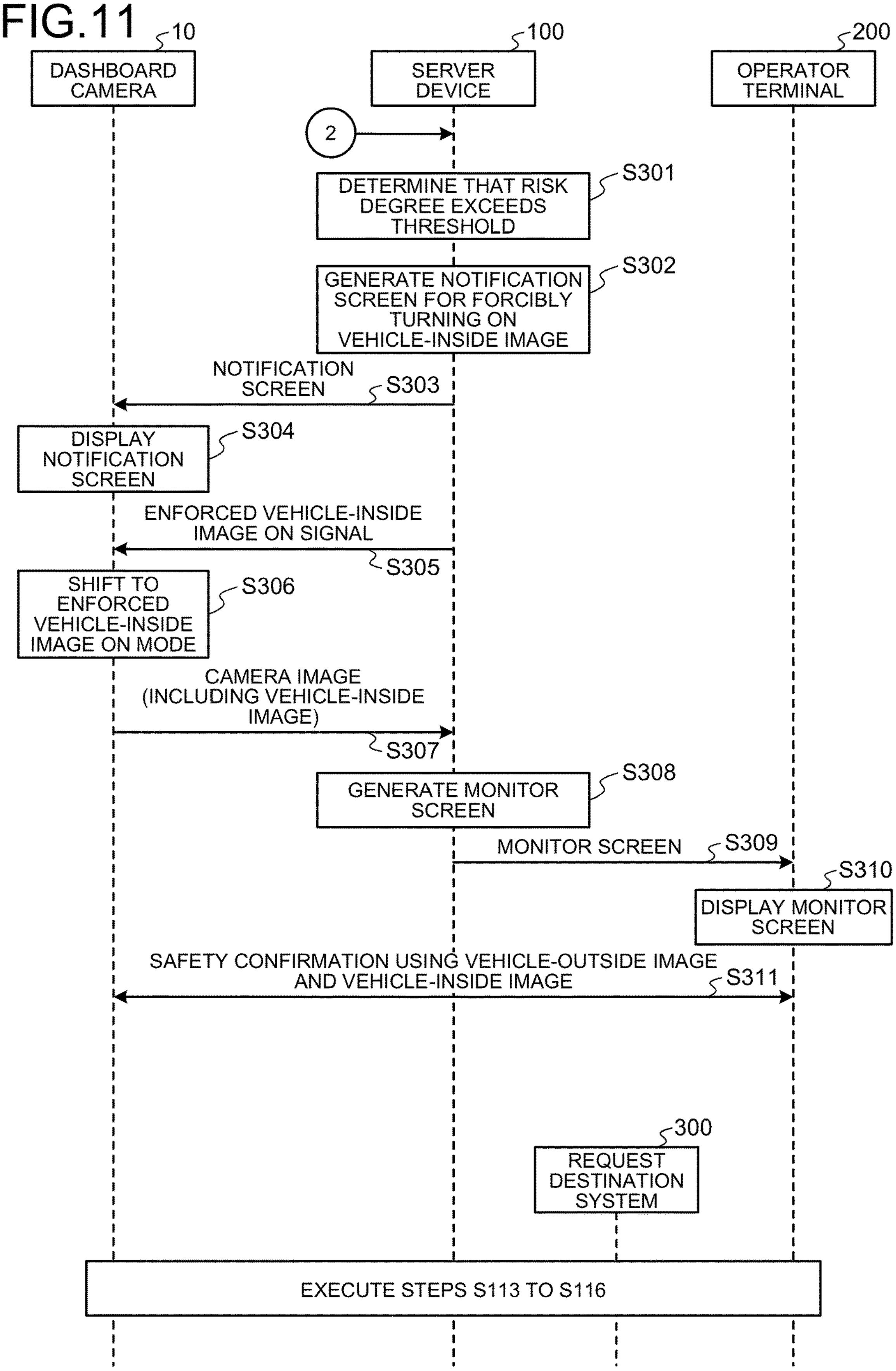
FIG. 11 is a diagram illustrating a processing sequence to be executed by the safety confirmation system according to the embodiment.

The controller 15 executes information processing according to processing sequences illustrated in FIG. 6, FIG. 7, and FIG. 11. Explanation with reference to FIG. 6, FIG. 7, and FIG. 11 will be mentioned later.

Figure 4:
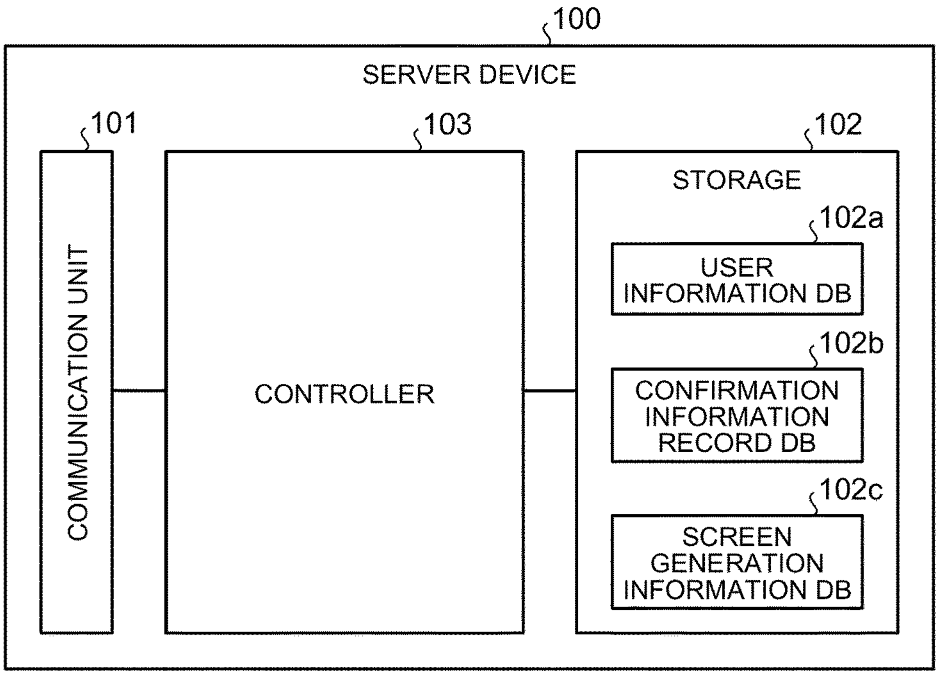
FIG. 4 is a diagram illustrating a configuration example of a server device according to the embodiment.

Next, a configuration example of the server device 100 will be explained. FIG. 4 is a diagram illustrating a configuration example of the server device 100 according to the embodiment. As illustrated in FIG. 4, the server device 100 includes a communication unit 101, a storage 102, and the controller 103.

The communication unit 101 is realized by a network adapter or the like. The communication unit 101 is connected to the network N1 in a wired or wireless manner, and further transmits and receives information to and from the dashboard camera 10 and the request destination system 300 via the network N1. The communication unit 101 is connected to the network N2 in a wired or wireless manner, and further transmits and receives information to and from the operator terminal 200 via the network N2.

The storage 102 is realized by a storage device such as a ROM, a RAM, a flash memory, and a Hard Disk Drive (HDD). In the example illustrated in FIG. 4, the storage 102 stores therein a user information Database (user information DB) 102*a*, a confirmation information record DB 102*b*, and a screen generation information DB 102*c*.

The user information DB 102*a* is a database of the user information 14*a* that is collected from the dashboard cameras 10. The user information DB 102*a* may store therein vehicle data collected from the dashboard cameras 10 for each piece of the user information 14*a*.

The confirmation information record DB 102*b* is a database that records therein an image used for a safety confirmation process, an interaction content in the safety confirmation process, and confirmation information including confirmation result. The interaction content includes a history of interaction using sounds and a history of interaction using an interactive operation. In a case where such a history is recorded, it is possible to perform objective evaluation of whether or not interaction having a high response quality is performed from a viewpoint of privacy protection.

The screen generation information DB 102*c* is a database that stores therein, for example, various parameters and a Graphical User Interface (GUI) that are used when the controller 103 generates screens such as the above-mentioned interactive screens and monitor screens. The various parameters include, for example, a parameter related to a screen layout in each screen, and the like.

The controller 103 corresponds to a so-called processor. The controller 103 is realized by a CPU, an MPU, a GPU, and the like. The controller 103 executes a not-illustrated program according to the embodiment stored in the storage 102 while using a RAM as a work region. The controller 103 can be realized by an integrated circuit such as an ASIC and an FPGA.

Similar to the above-mentioned controller 15, the controller 103 executes information processing according to processing sequences illustrated in FIG. 6, FIG. 7, and FIG. 11. Explanation with reference to FIG. 6, FIG. 7, and FIG. 11 will be mentioned later.

Figure 5:
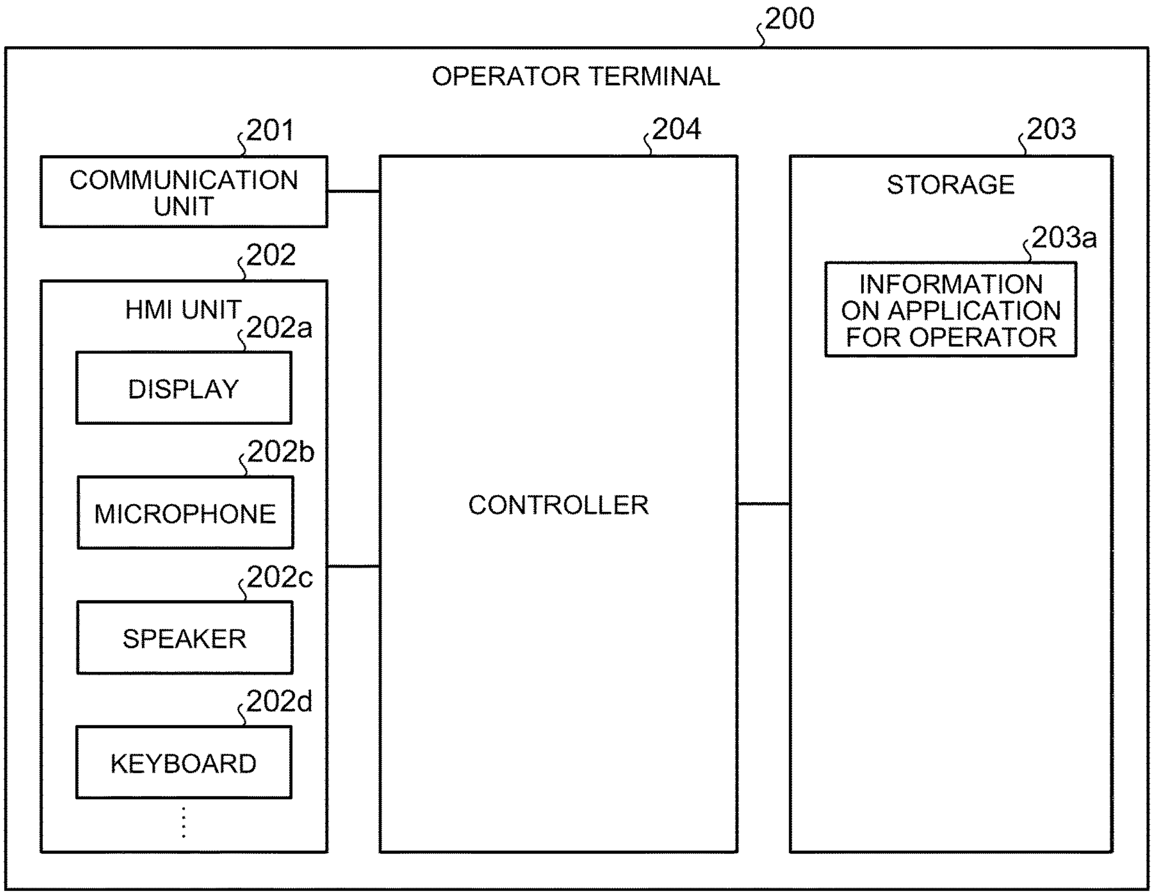
FIG. 5 is a diagram illustrating a configuration example of an operator terminal according to the embodiment.

Next, a configuration example of the operator terminal 200 will be explained. FIG. 5 is a diagram illustrating a configuration example of the operator terminal 200 according to the embodiment. As illustrated in FIG. 5, the operator terminal 200 includes a communication unit 201, an HMI unit 202, a storage 203, and a controller 204.

The communication unit 201 is realized by a network adapter or the like. The communication unit 201 is connected to the network N2 in a wired or wireless manner, and further transmits and receives information to and from the server device 100 via the network N2.

The HMI unit 202 is a configuration element that is configured to provide an interface component related to input and output to and from an operator using the operator terminal 200. The HMI unit 202 includes an input interface that receives an input operation performed by an operator. The HMI unit 202 includes an output interface that presents visual information and/or sound information for an operator.

As illustrated in FIG. 5, the HMI unit 202 includes a display 202*a*, a microphone 202*b*, a speaker 202*c*, and a keyboard 202*d*, for example. The display 202*a* corresponds to the above-mentioned output interface. The display 202*a* displays a monitor screen that includes one or both of a vehicle-outside image and a vehicle-inside image captured after receiving a notification of detection of a strong acceleration, for example.

The microphone 202*b* corresponds to an input interface that is used in communication between an operator and an occupant with the use of sounds. The speaker 202*c* also corresponds to an output interface that is used in the communication.

The keyboard 202*d* corresponds to an input interface that receives an operation of an operator with respect to a monitor screen, for example. Note that the input interface may be additionally realized by a mouse, a pen tablet, or the like. Moreover, the input interface may be realized by a software component.

The HMI unit 202 may be configured to integrally provide, to an operator, an input interface and an output interface by using a touch panel display, for example.

The storage 203 is realized by a storage device such as a ROM, a RAM, a flash memory, and a HDD. In the example illustrated in FIG. 5, the storage 203 stores therein information on application for operator 203*a*.

The information on application for operator 203*a* is information related to application for operator to be executed in the operator terminal 200, and further includes a program of the application for operator. The information on application for operator 203*a* may be realized as Web application that uses the server device 100 as a Web server.

The controller 204 corresponds to a so-called processor. The controller 204 is realized by a CPU, an MPU, a GPU, or the like. The controller 204 executes the above-mentioned program of application for operator, which is stored in the storage 203, while using a RAM as a work region. The controller 204 can be realized by an integrated circuit such as an ASIC and an FPGA.

Similar to the above-mentioned controller 15 and the controller 103, the controller 204 executes information processing according to processing sequences illustrated in FIG. 6, FIG. 7, and FIG. 11.

Next, information processing according to the above-mentioned processing sequence will be explained one-by-one. FIG. 6 is a diagram illustrating a processing sequence to be executed by the safety confirmation system 1 according to the embodiment. FIG. 7 is a diagram illustrating a processing sequence to be executed by the safety confirmation system 1 according to the embodiment. A processing procedure illustrated in FIG. 6 corresponds to the processing procedure of the above-mentioned first-step safety confirmation process. A processing procedure illustrated in FIG. 7 corresponds to the processing procedure of the above-mentioned second-step safety confirmation process.

As illustrated in FIG. 6, the controller 15 of the dashboard camera 10 determines whether or not an impact (in other words, strong acceleration) is detected (Step S101). In a case where an impact is detected (Step S101: Yes), the controller 15 transmits information on detection of the impact to the server device 100 (Step S102). In a case where an impact is not detected (Step S101: No), the controller 15 repeats the process of Step S101.

In a case where receiving a notification in Step S102, the controller 103 of the server device 100 executes forcible communication connection ("forcible communication connection") between the dashboard camera 10 and the operator terminal 200 (Step S103).

The controller 15 of the dashboard camera 10 transmits, to the server device 100, camera image captured by the vehicle-outside camera 13*a* and the vehicle-inside camera 13*b* (Step S104). The controller 103 of the server device 100 generates a monitor screen that displays in real time the camera images transmitted in Step S104 (Step S105), and further transmits the generated monitor screen to the operator terminal 200 (Step S106).

The controller 204 of the operator terminal 200 causes the display 202*a* of the HMI unit 202 to display the above-mentioned transmitted monitor screen (Step S107).

The controller 103 of the server device 100 determines whether or not the camera image transmitted from the dashboard camera 10 includes a vehicle-inside image, in other words, whether or not a vehicle-inside image is in ON setting (Step S108).

In a case where a vehicle-inside image is included (Step S108: Yes), the controller 103 allows safety confirmation between the operator terminal 200 and the dashboard camera 10 with the use of a vehicle-outside image, a vehicle-inside image, and communication (Step S109). In a case where a vehicle-inside image is included by "vehicle-inside image ON setting" from the beginning, a priority with respect to privacy protection of an occupant is considered to be low, thus safety confirmation can be executed with the use of at least a vehicle-inside image and communication in accordance with the above-mentioned priority.

Regarding confirmation result of the safety confirmation, an operator performs an input operation as needed, the controller 204 of the operator terminal 200 acquires an input operation of the above-mentioned confirmation result (Step S110). Next, the controller 204 transmits the acquired confirmation result to the server device 100 (Step S111).

The controller 103 of the server device 100 records as needed confirmation information that includes an image, an interaction content, and confirmation result of Step S111 (Step S112). The controller 204 of the operator terminal 200 acquires an arrangement operation according to confirmation result by an operator (Step S113), and further transmits, to the server device 100, an arrangement request corresponding to the above-mentioned arrangement operation (Step S114).

In a case where receiving an arrangement request in Step S114, the controller 103 of the server device 100 executes an arrangement process for a request destination in accordance with the arrangement request (Step S115). In the above-mentioned arrangement process, the controller 103 transfers an arrangement request to the request destination system 300 corresponding to the request (Step S116). Thus, it is possible to automatically and appropriately make a request for service of needed vehicles and personnel in accordance with confirmation result of the safety confirmation.

Note that in a case where a vehicle-inside image is not included (Step S108: No), in other words, in a case where a vehicle-inside image is in OFF setting, the controller 103 executes a second-step safety confirmation process illustrated in FIG. 7. As illustrated in FIG. 7, in the second-step safety confirmation process, the controller 103 of the server device 100 causes the operator terminal 200 to make a call using communication via the dashboard camera 10 (Step S201).

If an occupant is able to respond with communication, response with communication to the operator terminal 200 is executed via the dashboard camera 10 (Step S202).

In parallel with Steps S201 and S202, the controller 103 of the server device 100 generates an interactive screen (Step S203), and further transmits the generated interactive screen to the dashboard camera 10 (Step S204). The controller 15 of the dashboard camera 10 causes the touch panel display 12*a* of the HMI unit 12 to display the above-mentioned interactive screen (Step S205). Thus, in a case where an occupant can perform an interactive operation on an interactive screen even if the occupant is not able to perform interaction with sounds, it is possible to perform safety confirmation by the above-mentioned interactive operation by using interaction with an operator.

In a case where an occupant is able to respond to the displayed interactive screen with the use of an interactive operation, response by the interactive operation is executed from the dashboard camera 10 to the operator terminal 200 (Step S206).

Figure 8:
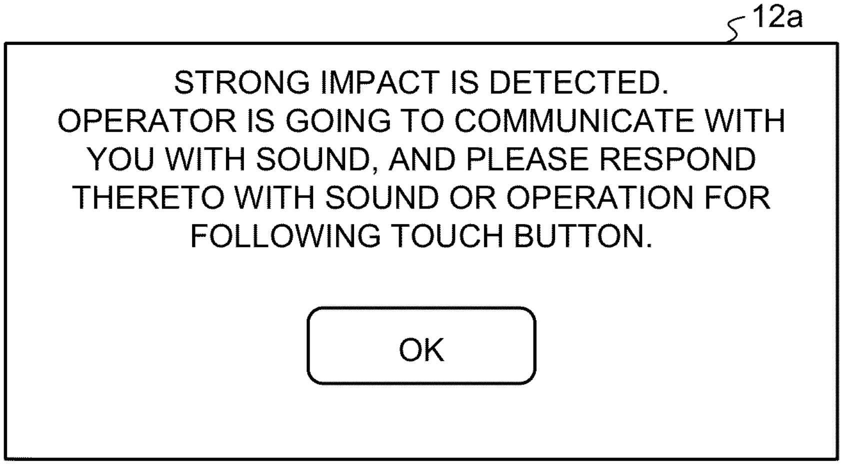
FIG. 8 is a diagram illustrating a specific example of an interactive screen.
Figure 9:
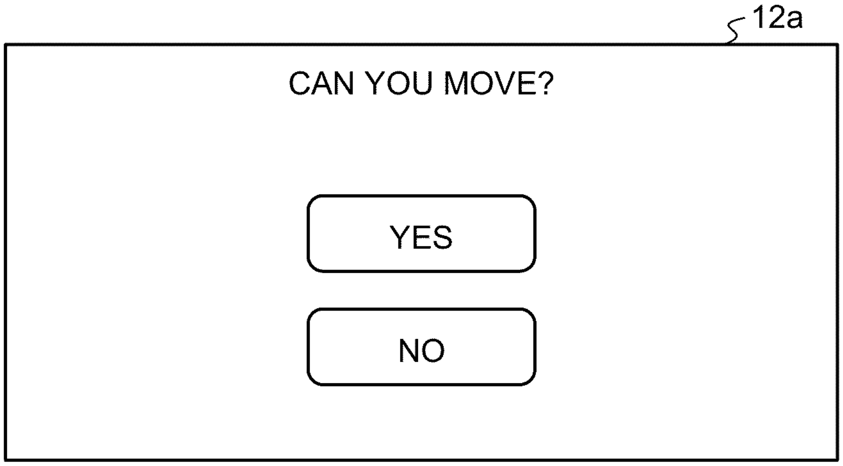
FIG. 9 is a diagram illustrating a specific example of the interactive screen.
Figure 10:
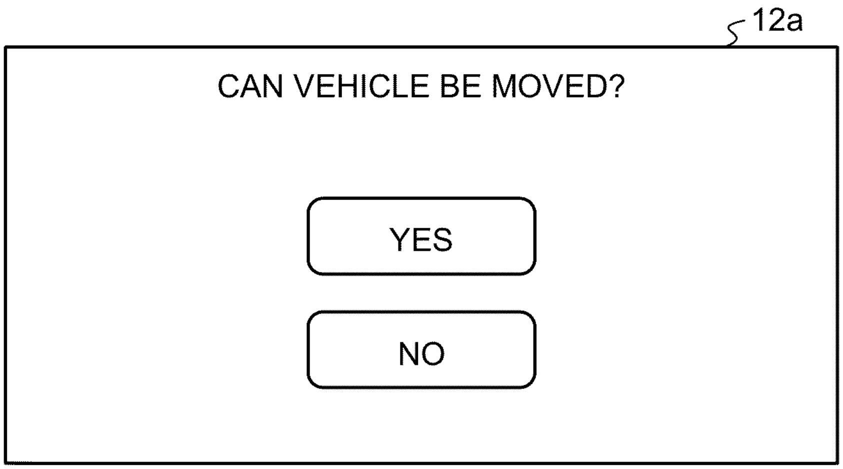
FIG. 10 is a diagram illustrating a specific example of the interactive screen.

Herein, specific examples of the interactive screen will be explained with reference to FIG. 8 to FIG. 10. FIG. 8 is a diagram illustrating a specific example of an interactive screen. FIG. 9 is a diagram illustrating a specific example of the interactive screen. FIG. 10 is a diagram illustrating a specific example of the interactive screen.

As illustrated in FIG. 8, the controller 103 displays, on the touch panel display 12*a* of the dashboard camera 10, an interactive screen indicating the fact that response is possible by using a sound or a touch button just after detection of an impact.

An occupant looks an interactive screen such as the example illustrated in FIG. 8 so as to make a response with the use of sounds if a response with the use of sounds is possible. Or an occupant touches a touch button of "OK" so as to make a response with the use of an interactive operation if response with the use of sounds is impossible, for example.

As illustrated in FIG. 9, the controller 103 displays, on the touch panel display 12*a* of the dashboard camera 10, an interactive screen that inquires whether or not an occupant can move his/her body, for example.

In looking an interactive screen as illustrated in FIG. 9, an occupant makes a response with the use of sounds if he/she can make a response with the use of sounds. Or if a response with the use of sounds is impossible, an occupant touches a touch button of "YES" or "NO" so as to make a response with the use of an interactive operation, for example.

As illustrated in FIG. 10, the controller 103 displays, on the touch panel display 12*a* of the dashboard camera 10, an interactive screen that inquires whether or not a vehicle can be moved, for example.

In looking an interactive screen as illustrated in FIG. 10, an occupant makes a response with the use of sounds if he/she can make a response with the use of sounds. Or if a response with the use of sounds is impossible, an occupant touches a touch button of "YES" or "NO" so as to make a response with the use of an interactive operation, for example.

Returning to explanation with reference to FIG. 7. Next, the controller 103 of the server device 100 determines whether or not interaction is possible on the basis of the response with the use of communication in Step S202 or the response with the use of an interactive operation in Step S206 (Step S207).

In Step S207, in a case where there presents no response with the use of an interactive operation and further there presents no utterance from an occupant for equal to or more than a predetermined time interval regarding response with the use of communication, for example; the controller 103 determines no availability of interaction. Thus, it is possible to estimate a situation in which an occupant is in a serious state having a degree that he/she cannot perform an interactive operation or utter, etc.

In a case where there presents no response with an interactive operation and utterance from an occupant cannot be interpreted regarding response with the use of communication, for example; the controller 103 determines no availability of interaction. Thus, it is possible to estimate a situation in which an occupant can utter, but the utterance is merely a moan that cannot be interpreted by using sound recognition, and the like, and an occupant cannot perform an interactive operation so as to be in a serious state and the like.

In a case where there presents no response with the use of sounds, and further there presents no response with the use of an interactive operation for equal to or more than a predetermined time interval, the controller 103 determines no availability of interaction. Thus, it is possible to estimate a situation in which an occupant is in a serious state, and thus cannot perform response with the use of sounds or an interactive operation.

In a case where determining that interaction is impossible in Step S207 (Step S207: Yes), the controller 103 causes the operator terminal 200 and the dashboard camera 10 to execute safety confirmation therebetween with the use of a vehicle-outside image and communication or an interactive operation and without a vehicle-inside image (Step S208). Thus, it is possible to execute safety confirmation with the use of a vehicle-outside image and communication or an interactive operation while keeping privacy protection of an occupant without using a vehicle-inside image.

Regarding confirmation result of safety confirmation, an operator performs an input operation as needed, and the controller 204 of the operator terminal 200 acquires the input operation for confirmation result (Step S209). Next, the controller 204 transmits the acquired confirmation result to the server device 100 (Step S210).

The controller 103 of the server device 100 records as needed confirmation information including an image, an interaction content, and the confirmation result in Step S210 (Step S211). Note that the controller 103 constantly determines whether or not a response stops during confirmation in Step S208 to Step S211 (Step S212). A determination condition in Step S212 may be the same or similar to the determination condition having been explained in Step S207.

In a case where there presents no stop in response during confirmation (Step S212: No), the controller 103 executes Step S113 to Step S116 illustrated in FIG. 6. On the other hand, in a case where determining no availability of interaction in Step S207 (Step S207: No), the controller 103 executes the above-mentioned third-step safety confirmation process. In a case where response stops during confirmation in Step S212 (Step S212: Yes), the controller 103 also executes the third-step safety confirmation process.

Figure 12:
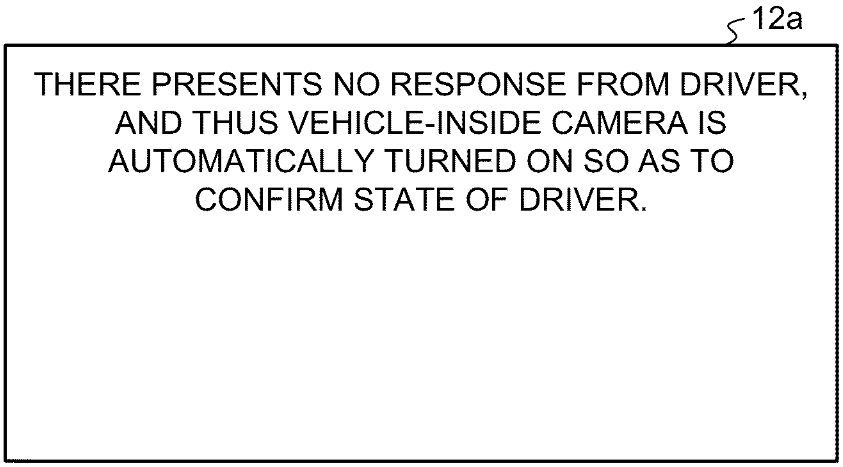
FIG. 12 is a diagram illustrating a specific example of a notification screen.

FIG. 11 is a diagram illustrating a processing sequence to be executed by the safety confirmation system 1 according to the embodiment. A processing procedure illustrated in FIG. 11 corresponds to that of the third-step safety confirmation process. FIG. 12 is a diagram illustrating a specific example of a notification screen.

As illustrated in FIG. 11, in the third-step safety confirmation process, the controller 103 of the server device 100 determines that a risk degree of an occupant exceeds a threshold (Step S301). In other words, the controller 103 determines that the present situation is in a state where priority should be more provided to human life of an occupant and the like than privacy protection of an occupant, and thus generates a notification screen for forcibly turning ON a vehicle-inside image (Step S302).

The controller 103 transmits the generated notification screen to the dashboard camera 10 (Step S303). The controller 15 of the dashboard camera 10 displays the above-mentioned notification screen on the touch panel display 12*a* of the HMI unit 12 (Step S304).

As illustrated in FIG. 12, there presents no response from an occupant, and thus the above-mentioned notification screen displays a message indicating the fact that the vehicle-inside camera 13*b* is automatically turned ON and the like. There presents possibility that an occupant cannot recognize actually and visually the above-mentioned notification screen, in a case where a history including the above-mentioned notification screen is stored in the confirmation information record DB 102*b*, it is possible to leave a record indicating that the vehicle-inside camera 13*b* is turned ON, on purpose, while considering privacy protection of an occupant.

Returning to explanation of FIG. 11. The controller 103 of the server device 100 transmits, to the dashboard camera 10, an "enforced vehicle-inside image ON signal" that is a control signal for forcibly turning the vehicle-inside camera 13*b* into an ON state (Step S305).

On receiving the "enforced vehicle-inside image ON signal", the controller 15 of the dashboard camera 10 shifts the dashboard camera 10 to an enforced vehicle-inside image ON mode (Step S306). In other words, the controller 15 forcibly turns the vehicle-inside camera 13*b* into an ON state, which was in an OFF state.

The controller 15 transmits, to the server device 100, a camera image including a vehicle-inside image (Step S307). The controller 103 of the server device 100 generates a monitor screen that displays in real time the camera image in Step S307 (Step S308), and further transmits the generated monitor screen to the operator terminal 200 (Step S309).

The controller 204 of the operator terminal 200 causes the display 202*a* of the HMI unit 202 to display the transmitted monitor screen (Step S310). The controller 103 of the server device 100 causes the operator terminal 200 and the dashboard camera 10 to execute therebetween safety confirmation with the use of a vehicle-outside image and a vehicle-inside image (Step S311).

As described above, in the third-step safety confirmation process, only in a case where a risk degree of an occupant exceeds a threshold, the controller 103 forcibly turns the vehicle-inside camera 13*b* into an ON state if the vehicle-inside camera 13*b* is in an OFF state. In other words, the controller 103 causes the dashboard camera 10 to forcibly transmit a vehicle-inside image. The controller 103 causes to execute safety confirmation with the use of a vehicle-outside image and a vehicle-inside image. Thus, it is possible to realize bare minimum safety confirmation of an occupant while protecting privacy of the occupant.

Thereafter, the controller 103 executes the processes in Step S113 to Step S116 illustrated in FIG. 6.

As described above, the server device 100 (corresponding to one example "center device") according to the embodiment includes the controller 103. The controller 103 receives vehicle information related to a behavior of a vehicle from the dashboard camera 10 (corresponding to one example of "on-vehicle device"). In a case where detecting an occurrence of an abnormality from the vehicle information, the controller 103 requests a vehicle-inside image (corresponding to one example of "camera image inside vehicle") from the dashboard camera 10. In a case where there presents no response to the request from the dashboard camera 10, the controller 103 transmits a control signal for forcibly transmitting the vehicle-inside image, and further acquires the vehicle-inside image from the dashboard camera 10. Specifically, in a case where receiving information indicating that a predetermined strong acceleration is detected from the dashboard camera 10 including the vehicle-inside camera 13*b* that captures a vehicle-inside image of the vehicle, the controller 103 detects an occurrence of an abnormality from the above-mentioned information, and further executes a gradual safety confirmation process for safety confirmation with respect to an occupant of the vehicle. In a case where a step of the above-mentioned safety confirmation process that is preliminarily associated with a risk degree of the occupant exceeds a threshold, and further the vehicle-inside camera 13*b* is in an OFF state, the controller 103 transmits, to the dashboard camera 10, a control signal for forcibly turning the vehicle-inside camera 13*b* into an ON state. The controller 103 acquires a vehicle-inside image from the dashboard camera 10.

Therefore, in a case where receiving the acceleration corresponding to a strong impact as vehicle information from the dashboard camera 10, for example, the controller 103 transmits, to the dashboard camera 10, a control signal for forcibly transmitting a vehicle-inside image if the vehicle-inside image cannot be acquired from the dashboard camera 10. The dashboard camera 10 forcibly transmits, to the server device 100, a vehicle-inside image in accordance with the control signal, and further the controller 103 acquires a vehicle-inside image that is forcibly transmitted from the dashboard camera 10. Thus, even in a case where an occupant sets a vehicle-inside camera to an OFF state for privacy protection, the controller 103 is capable of acquiring a vehicle-inside image under a situation in which an occupant is estimated to be in a serious state, for example. In other words, in accordance with the server device 100 according to the embodiment, it is possible to realize safety confirmation of an occupant with the use of a vehicle-inside image even in a case where the vehicle-inside image is set to an OFF state.

In accordance with one aspect of an embodiment, a controller of a center device is configured to: in a case where receiving, as vehicle information, an acceleration corresponding to a strong impact from an on-vehicle device, for example, and further in a case where a camera image inside a vehicle cannot be acquired from the on-vehicle device, to transmit a control signal for forcibly transmitting the camera image to the on-vehicle device. In accordance with the control signal, the on-vehicle device forcibly transmits, to a center device, the camera image inside the vehicle, and a controller of the center device acquires a camera image inside the vehicle which is forcibly transmitted from the on-vehicle device. Thus, even in a case where an occupant sets a vehicle-inside camera to an OFF state for privacy protection, the controller of the center device is capable of acquiring a camera image inside the vehicle under a situation where the occupant is in a serious state, for example. In other words, in accordance with one aspect of the embodiment, it is possible to realize safety confirmation of an occupant with the use of a vehicle-inside image even in a case where a vehicle-inside image is set to an OFF state.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A center device comprising:
a controller configured to:
receive an OFF signal of a vehicle-inside camera;
receive acceleration data of a vehicle;
confirm the acceleration data equal to or exceeding a threshold;
dispatch an occupant call message to an on-vehicle device for checking occupant safety upon the confirmation with respect to the acceleration data;
dispatch an interactive screen via which an interactive operation by an occupant is possible upon the confirmation with respect to the acceleration data;
confirm that an audio reply message by the occupant and the interactive operation by the occupant are not detected from the on-vehicle device within a predetermined latency;
request the vehicle-inside camera to transmit a vehicle interior image regardless of an operation mode of the vehicle-inside camera upon the confirmation of no detection with respect to the audio reply message and the interactive operation; and
acquire the vehicle interior image from the vehicle-inside camera.

2. The center device according to claim 1, wherein
the controller is further configured to:
execute a safety confirmation in which a priority of privacy protection in a case where the controller receives the OFF signal of the vehicle-inside camera is higher than a priority of privacy protection in a case where the controller receives an ON signal of the vehicle-inside camera.

3. The center device according to claim 1, wherein
the controller is further configured to:
in a case where the controller receives the OFF signal of the vehicle-inside camera, execute a safety confirmation in which a priority of privacy protection in a case where there presents no response to the safety confirmation from the occupant is lower than a priority of privacy protection in a case where there presents a response to the safety confirmation from the occupant.

4. The center device according to claim 1, wherein
the controller is further configured to:
in a case where the controller receives the ON signal of the vehicle-inside camera, receive the vehicle interior image from the on-vehicle device; and
transmit, to the on-vehicle device, a calling message for the occupant by using at least a sound by a communication connection and the vehicle interior image.

5. The center device according to claim 1, wherein
the controller is further configured to:
in a case where determining no availability of interaction, to the on-vehicle device, transmit a control signal for forcibly turning the vehicle-inside camera into an ON state;
receive a vehicle interior image from the on-vehicle device; and
execute the safety confirmation using the vehicle interior image.

6. The center device according to claim 1, wherein
the controller is further configured to:
to a request destination system, transmit an arrangement request in accordance with confirmation result of the safety confirmation process.

7. An on-vehicle device configured to communicate with a center device, the on-vehicle device comprising:
a controller configured to:
include setting of whether or not transmitting a vehicle interior image to the center device;
in a case where a setting is selected for not transmitting the vehicle interior image to the center device, receive a conversation request with respect to an occupant of a vehicle from the center device;
in a case where the controller is not able to respond to the conversation request,
change the setting into that for transmitting the vehicle interior image to the center device in accordance with a control signal transmitted from the center device.

8. The on-vehicle device according to claim 7, wherein
the controller is further configured to:
from the center device, receive an occupant call message for checking occupant safety;
from the center device, receive an interactive screen via which an interactive operation by an occupant is possible, and
in a case where an audio reply message by the occupant and the interactive operation by the occupant are not transmitted from the on-vehicle device within a predetermined latency,
receive a control signal transmitted from the center device, and
in accordance with the control signal, change setting into one for transmitting the vehicle interior image to the center device.

* * * * *